United States Patent
Benhelal et al.

(10) Patent No.: US 11,697,597 B2
(45) Date of Patent: Jul. 11, 2023

(54) INTEGRATED PROCESS FOR MINERAL CARBONATION

(71) Applicant: Mineral Carbonation International Pty Ltd, Braddon (AU)

(72) Inventors: Emad Benhelal, Wallsend (AU); Geoffrey Frederick Brent, Valentine (AU); Eric Miles Kennedy, Newcastle (AU); Mark Stuart Rayson, Bar Beach (AU); Michael Stockenhuber, Bolwarra Heights (AU)

(73) Assignee: Mineral Carbonation International Pty Ltd, Canberra (AU)

( * ) Notice: Subject to any disclaimer, the term of this patent is extended or adjusted under 35 U.S.C. 154(b) by 0 days.

(21) Appl. No.: 16/965,804

(22) PCT Filed: Feb. 8, 2019

(86) PCT No.: PCT/AU2019/050098
§ 371 (c)(1),
(2) Date: Jul. 29, 2020

(87) PCT Pub. No.: WO2019/153047
PCT Pub. Date: Aug. 15, 2019

(65) Prior Publication Data
US 2021/0047197 A1    Feb. 18, 2021

(30) Foreign Application Priority Data
Feb. 8, 2018   (AU) .............................. 2018900382

(51) Int. Cl.
*C01F 5/24*   (2006.01)
*C01B 32/60*   (2017.01)
(Continued)

(52) U.S. Cl.
CPC ..................... *C01F 5/24* (2013.01)

(58) Field of Classification Search
None
See application file for complete search history.

(56) References Cited

U.S. PATENT DOCUMENTS

| 4,058,587 A | 11/1977 | Nelson |
| 9,440,189 B2 | 9/2016 | Mercier et al. |

(Continued)

FOREIGN PATENT DOCUMENTS

| CN | 101235440 A | 8/2008 |
| JP | 3715602 | 10/1937 |
| JP | H10249153 A | 9/1998 |

OTHER PUBLICATIONS

English language abstract and machine-assisted English translation for CN 101235440 A extracted from espacenet.com database on Nov. 4, 2021, 10 pages.

(Continued)

*Primary Examiner* — Daniel Berns
(74) *Attorney, Agent, or Firm* — Howard & Howard Attorneys PLLC (57) ABSTRACT

The present invention describes an integrated process for carbon dioxide capture, sequestration and utilisation, which comprises: a) providing an aqueous slurry comprising an aqueous solution and a particulate solid comprising an activated magnesium silicate mineral; b) in a dissolution stage, contacting a $CO_2$-containing gas stream with the aqueous slurry to dissolve magnesium from the mineral to provide a magnesium ion enriched aqueous solution and a magnesium depleted solid residue; c) recovering at least a portion of the magnesium depleted solid residue; d) in a separate acid treatment stage, reacting the recovered portion of the magnesium depleted solid residue with a solution comprising a mineral acid or acid salt to further dissolve magnesium and other metals and to provide an acid-treated solid residue; e) recovering the acid-treated solid residue; and f) in a separate precipitation stage, precipitating magnesium carbonate from the magnesium ion enriched aqueous solution.

18 Claims, 5 Drawing Sheets

(51) Int. Cl.
    *C01B 33/12*    (2006.01)
    *C01B 13/18*    (2006.01)
    *C01B 13/36*    (2006.01)
    *B01D 53/73*    (2006.01)
    *B01D 53/78*    (2006.01)
    *B01D 53/80*    (2006.01)
    *B01D 53/62*    (2006.01)
    *B01J 8/00*     (2006.01)

(56) References Cited

U.S. PATENT DOCUMENTS

2008/0299024 A1    12/2008    Gorset et al.
2010/0313794 A1    12/2010    Constantz et al.
2012/0128553 A1     5/2012    Chung et al.

OTHER PUBLICATIONS

English language abstract and machine-assisted English translation for JPH 10-249153 A extracted from espacenet.com database on Nov. 4, 2021, 8 pages.

Pasquier, Louis-Cesar et al., "Parameters for Direct Flute Gas CO2 Capture and Sequestration by Aqueous Mineral Carbonation Using Activated Serpentinite Based Mining Residue", Applied Geochemistry, vol. 50, Nov. 1, 2014, pp. 66-73.

Bai, P. et al. "A Facile Route to Preparation of High Purity Nanoporous Silica from Acid-Leached Residue of Serpentine", Journal of Nanoscience and Nanotechnology, 2014, vol. 14, pp. 6915-6922.

International Search Report for Application No. PCT/AU2019/050098 dated Apr. 26, 2019, 4 pages.

English language translation for JP 37-15602 prrovided by Davies Collison on Dec. 22, 2022, 7 pages.

INTEGRATED PROCESS FOR MINERAL CARBONATION

This application is the National Stage of International Patent Application No. PCT/AU2019/050098, filed on Feb. 8, 2019, which claims the benefit of Australian Patent Application No. 2018-900382 filed on Feb. 8, 2018, which are hereby incorporated by reference in their entirety.

FIELD OF THE INVENTION

The present invention relates to a process for carbon dioxide capture, sequestration and utilisation (CCSU), and to a reactor system suitable for implementing the process.

BACKGROUND TO THE INVENTION

The sequestration of carbon dioxide gas in repositories that are isolated from the atmosphere is a developing technology that is widely recognised as an essential element in global attempts to reduce carbon dioxide emissions to the atmosphere. The rapid increase in atmospheric carbon dioxide concentrations is of concern due to its properties as a greenhouse gas and its contribution to the phenomena of global warming and climate change. Prototype demonstration facilities for carbon dioxide capture and sequestration (CCS) exist in several countries and commercial scale operations have recently also emerged. While various technologies exist for the capture and concentration of carbon dioxide from combustion flue gases, such as in coal combustion for electrical power generation, most current facilities utilise underground sequestration by injection of pressurised carbon dioxide into suitable underground repositories. This is commonly known as geosequestration. This may occur in depleted oil or gas reservoirs or other underground porous formations that are suitably isolated from the atmosphere. These reservoirs or formations may be situated under land or sea. Another possible subterranean repository for carbon dioxide gas is so-called saline aquifers. Direct storage of carbon dioxide on the floor of the deep ocean has also been investigated but has yet to be successfully demonstrated on any significant scale.

Another field of study for carbon dioxide sequestration is that known as mineral carbonation, whereby carbon dioxide is chemically reacted with alkali or alkaline-earth metal oxide or silicate minerals to form stable solid carbonates. This approach is known as ex-situ mineral carbonation, as opposed to in-situ carbonation whereby carbon dioxide is deposited into underground mineral formations and reacts over longer timeframes with suitable minerals in existing underground formations.

Mineral carbonation has a number of potential advantages over other methods of carbon dioxide sequestration. These include permanence and stability of the formed carbonates and the elimination of any risks of leakage of carbon dioxide gas from repositories. Furthermore, suitable subterranean sites for geosequestration do not exist at all locations where they are required near to carbon dioxide emission sources. The chemical reactions of mineral carbonation are also thermodynamically favoured, with an exothermic release of energy due to the formation of the carbonates. The raw silicate minerals required for mineral carbonation are abundant and widely distributed globally. In particular, the magnesium silicate mineral broadly known as serpentinite has been estimated to be available in quantities sufficient to sequester all global emissions of carbon dioxide from known fossil fuel reserves. Magnesium silicate minerals may be readily mined and rendered suitable for use by known processing technologies. The minerals are generally benign and the environmental and safety risks are manageable.

So-called single stage carbonation processes such as that described by O'Connor et al., 2005. Aqueous Mineral Carbonation: Mineral Availability, Pre-treatment, Reaction Parametrics and Process Studies, DOE/ARC-TR-04-002. Albany Research Center, Albany, Oreg., USA, comprise the dissolution of magnesium from the activated mineral and precipitation of magnesium carbonate within a single stage, thereby producing a mixture of unreacted mineral, magnesium carbonate and silica. This mixture is difficult to separate into viable products. The process also does not allow selective tailoring of any product by altering process conditions to maximise value.

So-called two stage or multi stage carbonation processes comprise separate magnesium dissolution and magnesium carbonate precipitation stages. The magnesium dissolution stage uses a $CO_2$ containing gas stream. Various workers have described such processes, including Mercier et al. (U.S. Pat. No. 9,440,189B2) and Werner et al., Flue gas $CO_2$ mineralization using thermally activated serpentine: from single- to double-step carbonation, Physical Chemistry Chemical Physics 16 (2014) 24978-24993.

Existing multi-stage processes for carbonation of mineral ores using $CO_2$ as an acid source for dissolution are not capable of significant leaching of magnesium from the solid mineral, and thus are relatively inefficient as a significant fraction of magnesium is not utilised for reaction with $CO_2$. Furthermore, none of the other metals usually present in mineral feedstock ore such as Fe, Ni or Al are leached or utilised. This increases process costs as larger amounts of mineral must be processed due to the underutilisation of metal components and it also forgoes potential product revenue. A further problem with the existing carbonation processes is that the solid residue after dissolution is contaminated with residual metal species (usually Mg and Fe), lowering the value of the residue as a potential $SiO_2$ product.

Against this background it would be desirable to provide a new integrated process that sequesters $CO_2$ into carbonate and produces silica rich products in a more efficient manner than previously described.

SUMMARY OF THE INVENTION

The present invention seeks to provide a process for the permanent and safe capture and sequestration of carbon dioxide gas while producing products of economic value. The present invention is particularly concerned with an efficient and economically viable integrated process for the chemical conversion of carbon dioxide and magnesium silicate feedstocks to solid carbonates and silicates thereby enabling a reduction in the amount of carbon dioxide discharged to the atmosphere while simultaneously producing products of economic utility and value, in particular magnesium carbonates and silica. This utilisation of products categorises the process of the invention as CCSU, as opposed to CCS.

In an embodiment the present invention provides an integrated process for carbon dioxide capture, sequestration and utilisation, which comprises:

a) providing an aqueous slurry comprising an aqueous solution and a particulate solid comprising an activated magnesium silicate mineral;

b) in a dissolution stage, contacting a $CO_2$-containing gas stream with the aqueous slurry to dissolve magnesium from the mineral to provide a magnesium ion enriched aqueous solution and a magnesium depleted solid residue;
c) recovering at least a portion of the magnesium depleted solid residue;
d) in a separate acid treatment stage, reacting the recovered portion of the magnesium depleted solid residue with a solution comprising a mineral acid or acid salt to further dissolve magnesium and other metals and to provide an acid-treated solid residue;
e) recovering the acid-treated solid residue; and
f) in a separate precipitation stage, precipitating magnesium carbonate from the magnesium ion enriched aqueous solution.

The present invention also provides a reactor system adapted to perform the processes of the present invention. The reactor system comprises a dissolution vessel, a precipitation vessel and an acid treatment vessel.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavour to which this specification relates.

BRIEF DESCRIPTION OF THE DRAWINGS

Embodiments of the present invention are illustrated with reference to the accompanying non-limiting drawings in which.

DETAILED DISCUSSION OF THE INVENTION

In accordance with the invention it has been found advantageous to reduce the magnesium content of the activated mineral in a dissolution stage. In the process of the invention as noted above, a single dissolution stage is employed. However, it is possible that the invention may be implemented with more than one dissolution stage, with magnesium depleted solid residue from a preceding dissolution stage being formulated into a slurry with an aqueous solution followed by contacting the aqueous slurry with a $CO_2$-containing gas stream. Each dissolution stage will incrementally reduce the magnesium content of the activated mineral and yield a magnesium ion enriched aqueous solution. The magnesium ion enriched aqueous solution from one or more dissolution stages can be processed subsequently to precipitate carbonate in a precipitation stage. The solid residue produced after the dissolution stage (where only one such stage) or final dissolution stage (where more than one dissolution stage) is treated with a mineral acid or acid salt solution in a separate acid treatment stage. Valuable, high purity carbonate and silica products may thus both be produced and optimised at various stages. The process also allows other products to be recovered after the acid treatment step.

When the process of the invention comprises more than one dissolution stage the process may be defined as comprising the following steps:
a) providing an aqueous slurry comprising an aqueous solution and a particulate solid comprising an activated magnesium silicate mineral;
b) in a first dissolution stage, contacting a $CO_2$-containing gas stream with the aqueous slurry to partially dissolve magnesium from the mineral to provide a magnesium ion enriched aqueous solution and a magnesium depleted solid residue;
c) recovering the magnesium depleted solid residue and forming an aqueous slurry comprising an aqueous solution and the magnesium depleted solid residue;
d) in a subsequent dissolution stage contacting a $CO_2$-containing gas stream with the aqueous slurry comprising magnesium depleted solid residue to further dissolve magnesium from the magnesium depleted solid residue to provide a magnesium ion enriched aqueous solution and a further magnesium depleted solid residue;
e) recovering at least a portion of the further magnesium depleted solid residue;
f) in a separate acid treatment stage, reacting the recovered portion of the further magnesium depleted solid residue with a solution comprising a mineral acid or acid salt to further dissolve magnesium and other metals and to provide an acid-treated solid residue;
g) recovering the acid-treated solid residue; and
h) in a separate precipitation stage, precipitating magnesium carbonate from the magnesium ion enriched aqueous solution from the first and/or subsequent dissolution stage.

In the context of the present invention mineral carbonation refers to a reaction in which carbon dioxide is reacted with magnesium from an activated magnesium silicate mineral feedstock to form magnesium carbonates and silica. Reference to an activated mineral feedstock refers to feedstock that has been activated by grinding or heating or both. In the invention reactions take place in aqueous solutions with the carbonate precipitating out of at least one such solution in a precipitation stage.

The process of the invention includes a separate acid treatment stage wherein solid residue from a preceding dissolution stage is leached with a mineral acid or acid salt solution. Usually the solid residue that is treated is one resulting from the final dissolution stage in the overall process. Reference to dissolution stages refer to process steps wherein metal ions are leached from the solid into aqueous solutions. Reference to aqueous solutions includes solutions wherein water is the major liquid constituent (greater than 50% by mass) and includes solutions containing other dissolved species or minor (less than 50% by mass) liquid phases. Sea water, brines and saline solutions are included herein. The reference to aqueous solutions also embraces those solutions containing undissolved solids, which undissolved solids may be in suspension.

Reference to grinding processes includes attrition grinding and other well-known grinding processes such as stirred mills or other mills incorporating grinding media.

The magnesium silicate mineral may be activated by heating particulate mineral to elevated temperature, for example within the range 570° C. to 730° C., for example from 570° C. to 670° C., to form an activated particulate solid comprising dehydroxylated magnesium silicate. Heating may occur in a kiln or fluidised bed with residence times of 5 to 300 minutes, for example from 30 to 300 minutes. The activated particulate solid comprises dehydroxylated magnesium silicate and is usually cooled to below 200° C. prior to mixing with aqueous solution (e.g. water) to provide an aqueous slurry. In this embodiment, heat from the heated activated solid may be recovered for beneficial use, such as heating another process stream or producing steam for electrical power generation. Heat recovery may be conducted in a suitable heat exchanger system with heat from the mineral either directly or indirectly heating another process stream.

The particulate solid used in the process of the invention comprises a magnesium silicate mineral such as olivine, serpentinite, dunite or mixtures thereof. The solid may be ground to particle sizes whereby 50% by mass would pass a sieve with aperture size of 149 microns (100 mesh). Preferably, the solid is ground to particle sizes whereby 50% by mass would pass a sieve with aperture size of 20 microns (635 mesh).

The $CO_2$-containing gas stream used in each dissolution step may be from the same or different source. The gas stream may comprise a flue gas from a hydrocarbon combustion process or it may be a relatively pure stream of $CO_2$ captured from a hydrocarbon combustion, oxidation or reforming process or from natural gas processing. Such a stream may comprise $CO_2$ concentrations in the range 2-100% by volume. Capture processes are well known and may comprise the use of amines or other $CO_2$ absorbents or adsorbents or selective membranes to separate $CO_2$ from flue gas, or pre-combustion capture such as by so-called oxy-fuel combustion.

The magnesium depleted solid residue from any dissolution stage may subjected to a wet magnetic separation process to extract an iron-rich portion before any subsequent processing in accordance with the invention. Well known magnetic separators such as drum magnetic separators or wet high intensity magnetic separators may be used to extract the iron-rich portion.

The pressures and temperatures of each stage of the process may be varied to optimise reactions in each step. The absolute pressures may be maintained in the range 5 kPa to 20 000 kPa and temperatures in the range 10° C. to 200° C. Preferably the pressure in each dissolution stage is in the range 100-20 000 kPa and temperature is in the range 20° C.-185° C. Preferably the pressure in the precipitation stage in is in the range 5-5 000 kPa and temperature is in the range 20° C.-150° C. Preferably the pressure in the acid treatment stage is in the range 100-200 kPa and temperature is in the range 20° C.-120° C., for example 20° C.-80° C., or 20° C.-60° C., or 20° C.-40° C.

In one embodiment, the temperature in the acid treatment stage is below 40° C.

The mineral acid or acid salt used in the acid treatment stage may be chosen from $HNO_3$, $H_2SO_4$, HCl, $NaHSO_4$, HBr, HF, HI, $HClO_4$, $H_3BO_3$ or $H_3PO_4$.

It has been found that achieving a pH in the range of about −0.5 to 3 or from about −0.5 to 2 in the acid solution in the acid treatment stage keeps a substantial proportion of silica in solution. This is advantageous as it allows the Acid Treated Silicon Enriched Residue (ATSER) to be separated from the liquor via filtration so that the silica in solution can be precipitated separately to the ATSER, providing a higher purity product. In one embodiment, the pH for this stage is about 0.5 to 1.5. The acid-treated solid residue comprises silica that is not dissolved by the mineral acid, which can be recovered and purified as one product from the process of the invention. In one embodiment silica in the acid-treated solid residue following the acid treatment stage may be used as a pozzolanic material, for example replacing Portland cement.

Other valuable products may be obtained by selectively raising the pH and/or adjusting the temperature of the acid solution in the acid treatment stage to recover dissolved species, including dissolved silica. The production of other valuable products can occur after separating the acid-treated solid residue from the acid solution, for example, by filtering the solution to remove the acid-treated solid residue. Above pH 2, dissolved silica can be precipitated to obtain a high purity valuable silica product. In one embodiment, the pH of the separated acid solution is raised above 2, for example to pH 4.5 to 8.5 or to pH 4.5 to 5.5. By the addition of base while stirring the precipitated silica can be separated from the solution as a product. The temperature range for this is generally 20-100° C., for example 60-90° C. In one embodiment, the soluble precipitated silica from this process may be used as a pozzolanic material, for example as an additive in Portland cement based concrete formulations.

In another embodiment, dissolved metal species, for example including Fe, Ni and Al, may be precipitated out of the acid solution by selectively adjusting the solution pH. In particular, metal species may be recovered as metal hydroxides by addition of base. In yet another embodiment, metal oxides may be obtained from the so formed metal hydroxides through thermal hydrolysis or thermal decomposition or combinations of these processes.

The pH of the separated acid solution may be reduced by further addition of mineral acid. It has been found that below pH 0, dissolved silica can also be precipitated to obtain a high purity valuable silica product. In one embodiment, the pH of the acid solution from the acid treatment stage is lowered to be in the range pH −0.3 to −1.5, or −0.4 to −1.5, or −0.7 to −1.2.

The further acidification may be performed at a temperature in the range 20 to 90° C., for example 20 to 80° C., or 20 to 60° C. or 20 to 40° C. The remaining acid after precipitation of the silica can be recycled to the initial acid treatment step.

In one embodiment the invention provides a process in which a magnesium-enriched carbonated solution is produced by dissolving magnesium from an activated magnesium silicate in one or more dissolution steps in one or more reactors fed by an input $CO_2$-containing gas stream above atmospheric pressure and thereafter, in a separate precipitation step, inducing a pH shift in the solution by the removal of $CO_2$ by reducing the pressure to degas the solution thereby precipitating magnesium carbonate.

In one embodiment the invention provides a process in which a magnesium-enriched carbonated solution is produced by dissolving an activated magnesium silicate in one or more dissolution steps in one or more reactors fed by an input $CO_2$-containing gas stream near, at or above atmospheric pressure and thereafter, in a separate precipitation step, inducing a pH shift in the solution by the removal of $CO_2$ through the application of a partial vacuum or sub-atmospheric pressure to the solution thereby precipitating the magnesium carbonate.

In another embodiment the present invention provides a reactor system adapted to perform the processes of the present invention. The reactor system comprises a dissolution vessel, a separate precipitation vessel and an acid treatment vessel. In the dissolution vessel an activated mineral is dissolved in an aqueous solution of carbonic acid. The aqueous solution may be formed in the dissolution vessel by delivery of a carbon dioxide-containing gas stream into aqueous solution contained in the vessel. After the dissolution steps and separation of the undissolved solid residue, the solution in the dissolution vessel is transferred into the degassing/precipitation vessel where the pressure is lowered relative to the dissolution unit. This causes carbon dioxide to be liberated from the aqueous solution and magnesium carbonate to be precipitated. In accordance with an embodiment of the invention, the liberated carbon dioxide may be recycled back to the dissolution unit. The separated undissolved solid residue is reacted with an acid solution in the acid treatment vessel. The separated solution can be further treated either with addition of base or acid to precipitate silica from the acid solution. The silica can then be separated out from the treated solution.

In its simplest form the system may comprise a single dissolution vessel, a single degassing/precipitation vessel and a single acid treatment vessel. However, in another embodiment the system may comprise more than one of each type of vessel arranged in series or parallel configuration, along with pre- and post-processing unit operations such as liquid/solid separation processes. In this case the carbon dioxide liberated in respective degassing/precipitation vessels may be recycled to one or more dissolution vessels to enhance process efficiency. In embodiments a concentrated $CO_2$ stream can be reacted with activated mineral feedstock in separate vessels or recycled to one or more dissolution vessels, in order to form magnesium carbonate through subsequent degassing steps, thereby maximising the formation of magnesium carbonate as one valuable product of the invention.

The present invention may provide significant improvements over previous mineral carbonation processes, rendering the overall process more energetically and economically favourable than might have been expected and thus more competitive than the previous processes, particularly with the production of valuable carbonate, metal hydroxide or metal oxide and silica products. The present invention may therefore provide a more favourable means of conversion of carbon dioxide into stable magnesium carbonates thereby enabling a reduction in the amount of carbon dioxide discharged to the atmosphere. Embodiments of the invention may be implemented under energetically beneficial operating conditions (of pressure and temperature) when compared with those conditions used conventionally for ex situ mineral carbonation. Embodiments of the invention may be implemented using carbon dioxide containing gas streams that contain acidic and/or other impurities at higher levels than conventional processes have otherwise allowed.

Example 1

Dissolution of Activated Magnesium Silicate

Serpentinite rock comprising lizardite was collected from the Great Serpentine Belt in New South Wales, Australia. The rock was crushed and crushed samples were wet ground in a stainless steel ball mill and wet sieved to <75 μm, and dried in a laboratory oven at 110° C. for 24 h. The ground and dried raw lizardite was then heat activated in an electrically operated stainless steel rotary kiln at 630° C. for 4 h, and then allowed to cool.

Figure 1:
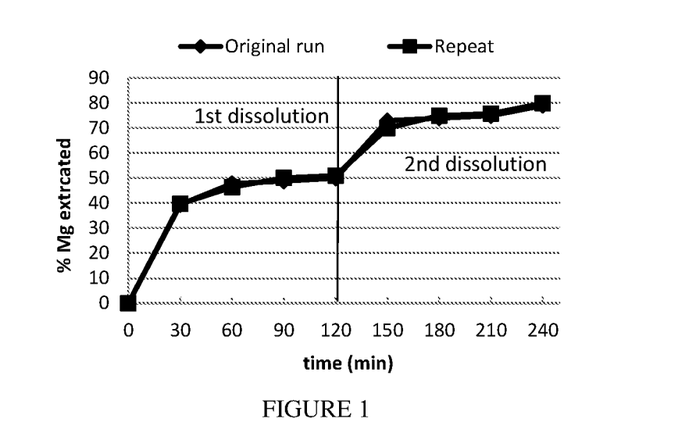
FIG. 1 shows the percentage of total available Mg and Si dissolved into solution (extracted) as a function of time for both runs (Example 1)
Figure 2:
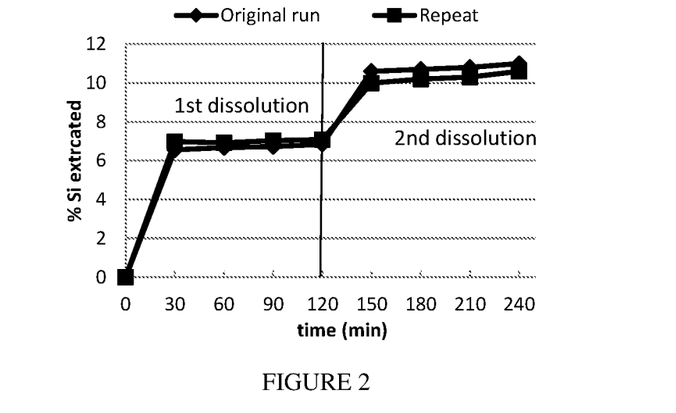
FIG. 2 shows the percentage of total available Mg and Si dissolved into solution (extracted) as a function of time for both runs (Example 1)

400 g of the heat activated lizardite was mixed with 20 L water to provide a 2 wt % solid/liquid slurry in a 30 L reactor that was then supplied with a pure $CO_2$ gas stream held at 6.5 bar $CO_2$. The reactor was fitted with a hollow shaft gas inducing impellor that draws $CO_2$ down into the slurry. The temperature for this (first) dissolution stage was held at 45° C. via a heating coil. The slurry was agitated with the impellor at 800 rpm for 2 h to extract Mg from the mineral, producing a magnesium ion enriched aqueous phase and a magnesium depleted solid residue. Two runs were performed. Sampling of the solution was conducted after 30, 60, 90 and 120 min and samples were analysed by an inductively coupled plasma optical emission spectrometer (ICP-OES) for dissolved Mg and Si. The solid residue produced at this stage was separated and wet milled in a stainless steel ball mill and then re-dissolved in a second dissolution stage. The conditions were the same as the first dissolution stage. FIGS. 1 and 2 show the percentage of total available Mg and Si dissolved into solution (extracted) as a function of time for both runs.

The solid residue after the second dissolution stage was filtered out and dried in an oven at 110° C. for 24 h and used as "SER" (Silicon Enriched Residue) sample. The filtered solution obtained after dissolution was allowed to degas under atmospheric conditions, causing magnesium carbonate to precipitate from solution.

Acid Treated Silica-Enriched Residue (ATSER)

A part of the dried SER sample was treated with 2 M nitric acid (5 wt % solid/liquid) at room temperature, in the reactor mixed at 600 rpm for 7 h in a separate acid treatment stage. The resultant mixture was filtered, the solid washed with distilled water and dried at 110° C. for 24 h. This material is referred to as "ATSER" (Acid Treated Silicon Enriched Residue). The aim of acid treatment was to extract the magnesium remaining in the SER sample, producing an almost pure reactive amorphous silica. The SER and ATSER were then tested for pozzolanic activity as follows.

Pozzolanic Activity

Determining the rate of silica dissolution from pozzolanic materials in the presence of hydroxide ions is important, as the extent of Si dissolution under alkaline conditions determines its application as a pozzolan. Due to the quick setting time of cement pastes, periodic sampling to determine the dissolved silicon is difficult. As a result, an experimental protocol was developed to mimic silicon extraction from pozzolans in cement paste pore solution, enabling a comparison of different pozzolanic materials by determining the rate of silicon leaching at pH-13.5 (similar to the pH of cement paste pore solution) of the feed and by-products of the mineral carbonation processes i.e. raw and heat activated lizardite, carbonated heat activated lizardite, SER and ATSER materials. The rate of silicon extraction from these by-products was compared with ground sand (an inert silica source) and silica fume (a highly reactive and widely used commercial pozzolanic material) as standards.

Figure 3:
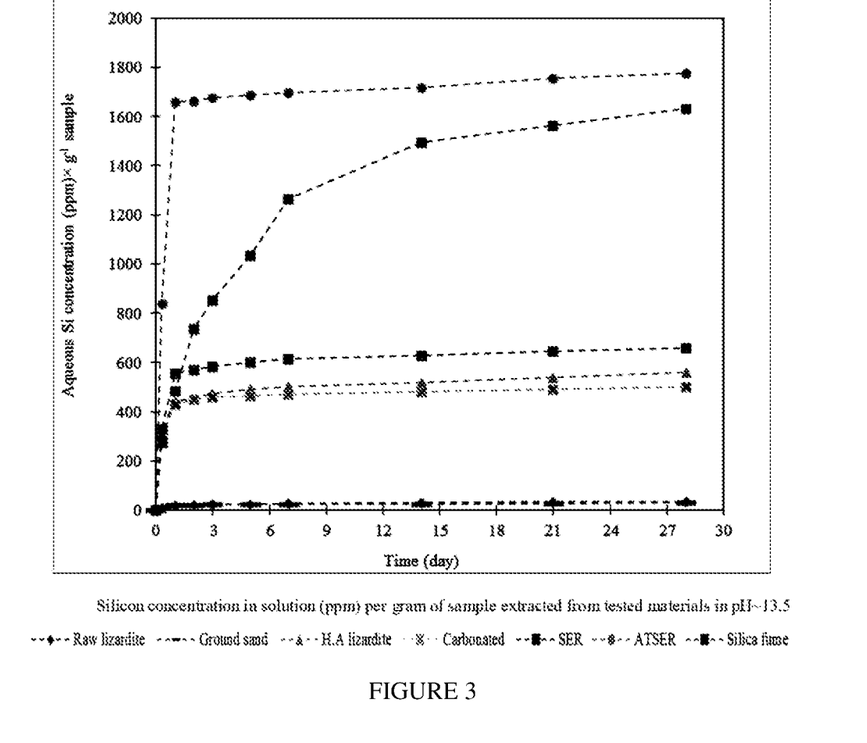
FIG. 3 shows ICP results that indicate the rate of silicon extraction from ATSER was the fastest among all material studied (Example 1)

ICP results in FIG. 3 indicated that the rate of silicon extraction from ATSER was the fastest among all materials studied. Almost 1650 ppm Si/g (92 wt % of the total silicon contained in the sample) was extracted from ATSER in 24 hours, and extraction was almost complete after 28 days. In comparison, silica fume displayed a lower extraction rate, with approximately 500 and 1250 ppm Si/g (24 and 60 wt % of silicon content) extracted in one and seven days, respectively. After 28 days, 1650 ppm Si/g (80 wt % of silicon content) was extracted from the silica fume. SER exhibited a slightly faster dissolution rate compared to heat activated and carbonated lizardite which showed similar silicon extraction rates, both liberating 500 ppm Si/g (55 wt % of total silicon content) after 28 days.

Portland cement mortars were made to evaluate the pozzolanic activity of the ATSER and the strength was measured at 28 days. The compressive strength of the mortars made during this study depends on both the quantity of added water and the pozzolanic activity of materials as the quantities of all other raw materials were kept constant. Comparing compressive strength of mortars with 10% ATSER with mortars made of pure cement (no additives) and mortars containing 10% silica fume showed that pozzolanic activity of ATSER is higher than cement and slightly lower than silica fume. The average 28 days strength of mortars with 10 wt % ATSER was 51.7 MPa and the average strength of cement and 10% silica fume mortars were 48.65 and 54 MPa respectively. The average 28 days strength of mortars with 10 wt % SER was only 46 MPa, 10% lower than the ATSER strength.

These results demonstrate the beneficial effect of the acid treatment of the solid residue (i.e. the ATSER material) after two exposures to $CO_2$ streams in initial dissolution stages. This example also demonstrates the advantage and usefulness of the invention by showing the increased pozzolanic activity of the acid treated solid residue, hence providing a valuable product.

Example 2

This example demonstrates one embodiment of the invention. In one embodiment, the pH of separated acid solution is raised above pH 2 by the addition of base and precipitated silica is separated out as a product. This example demonstrates how a substantial proportion of silica is held in solution at pH 0.63-0.85.

Figure 4:
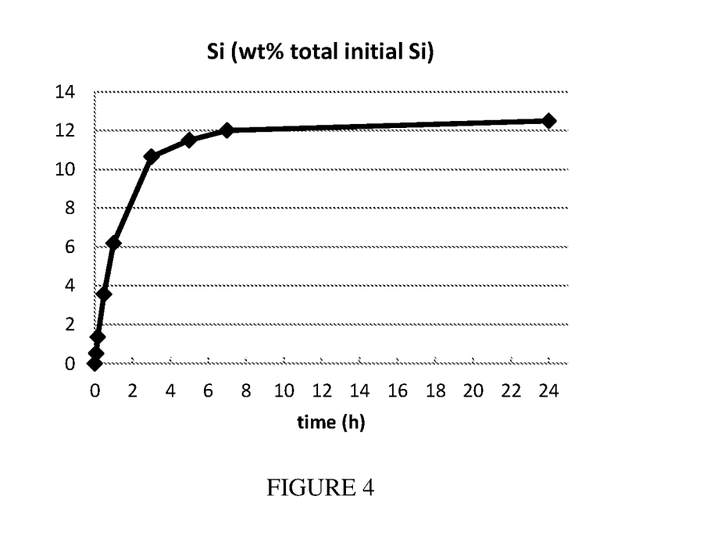
FIG. 4 shows ICP-OES results that confirm a substantial proportion of the total silica is held in solution and does not precipitate out at the conditions employed (Example 2)

6 g of the solid residue of the SER material from the $CO_2$ dissolution stages of Example 1 (in water+$CO_2$) was dissolved in 240 ml 1 M $NaHSO_4$ (an acid salt) solution for 24 hrs at room temperature in solid to liquid ratio of 2.5% by mass. The pH changed from 0.63 to 0.85. Samples were taken at 5, 10, 30 min and 1, 3, 5, 7 and 24 h and analysed by ICP-OES. FIG. 4 shows the ICP-OES results which confirm that a substantial proportion of the total silica is held in solution and does not precipitate out at these conditions. When the pH was raised or lowered substantially out of the range −0.5 to 2, silica was precipitated out of the solution. This silica represented a high purity valuable product.

Example 3

This example demonstrates a further embodiment of the invention. In this embodiment, the pH of separated acid solution is lowered by the addition of further mineral acid and the amount of silica held in solution is reduced by precipitation.

Four samples of the SER from Example 1 were dissolved in 0.5, 2, 4 and 8 Ni solution of nitric acid at 5% solid loading for 7 hrs at room temperature. The pH of the (15, 2, 4 and 8 M solutions of nitric acid were 0.32, −0.39, −0.61 and −1.02 respectively. The pH remained almost constant during the experiments. Samples were taken periodically during these dissolution experiments for analysis by ICP.

Figure 5:
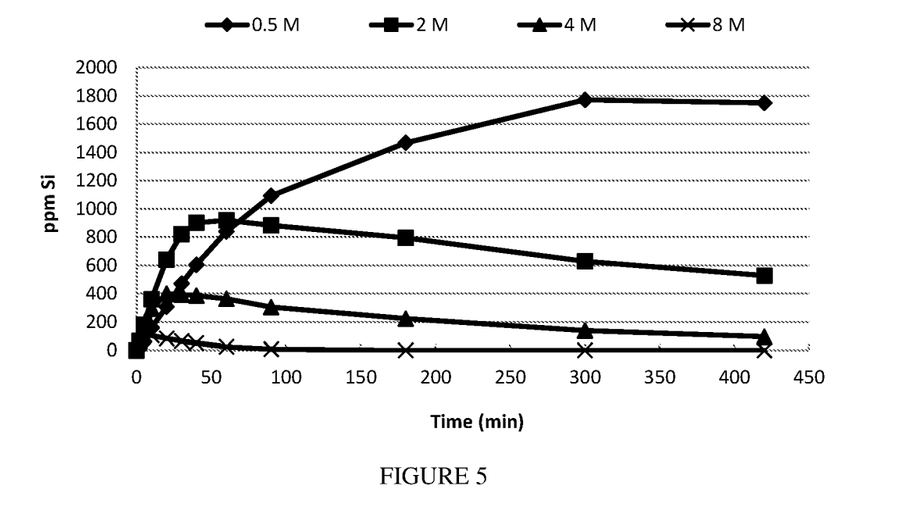
FIG. 5 shows the Si concentration in the acid solutions as a function of time (Example 3)
Figure 6:
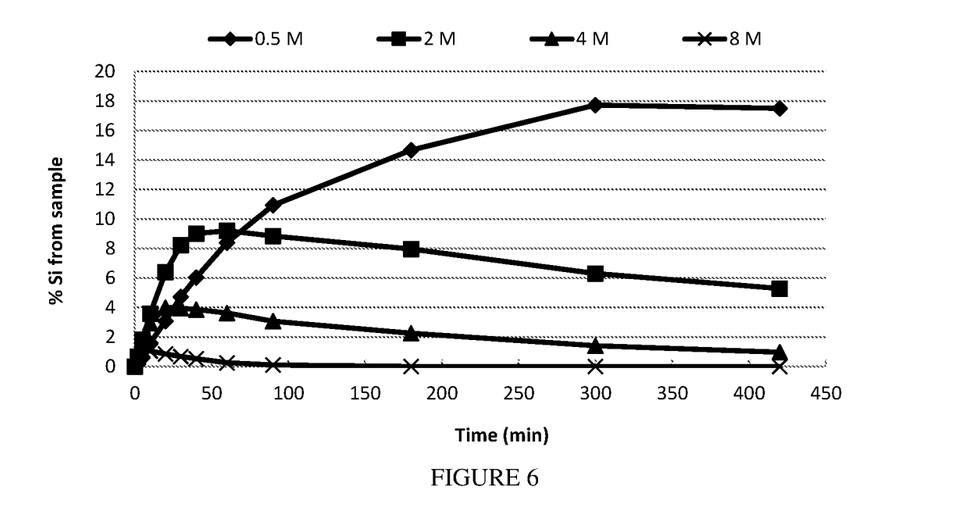
FIG. 6 shows the corresponding percentage of the available Si that was held in solution for each acid concentration corresponding to the various pH values (Example 3)

FIG. 5 shows the Si concentration in the acid solutions as a function of time while FIG. 6 shows the corresponding percentage of the available Si that was held in solution for each acid concentration corresponding to the various pH values. It, is evident that more silica dissolved at pH 0.32 and was held in solution over the time period of the experiment, peaking at 18% of total available silica. At lower pH values less silica was held in solution and was observed to precipitate out of solution during the experiment. This is evident from the initially higher concentrations of silica for the pH values of −0.39, −0.61 and −1.02 followed by reductions over time as the silica precipitated out of solution. This clearly demonstrates that lowering the pH from 0.32 through to −1.02 precipitates silica from solution. We use this finding as an advantageous route to precipitating valuable silica from the silica enriched residue from our integrated process.

Example 4

This example demonstrates two embodiments of the invention.

In the first embodiment, the pH of separated acid solution from an initial acid dissolution step of the SER from Example 1 is lowered further by the addition of further mineral acid. This causes pure silica to precipitate out of the acid solution at lower pH values and this precipitated silica can then be separated out as a valuable product.

In the second embodiment, the pH of separated acid solution from the initial acid dissolution step of the SER from Example 1 is instead increased by the addition of base. This causes silica to precipitate out of the solution, together with other dissolved metal species as metal hydroxides. This precipitated silica and metal hydroxides can then be treated further to extract valuable products. The metal hydroxides can be converted to corresponding metal oxides through thermal hydrolysis or thermal decomposition or a combination thereof.

Figure 7:
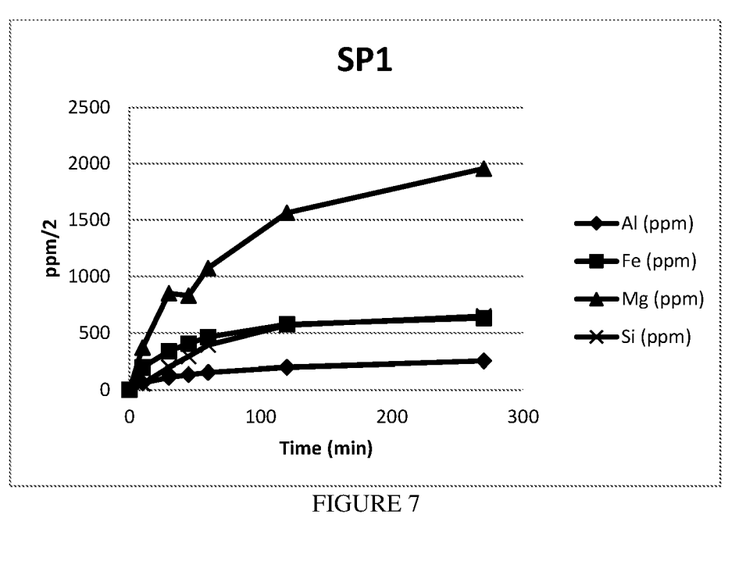
FIG. 7 shows ICP results (Example 4)

A sample of the SER from Example 1 was dissolved in 0.5 M solution of nitric acid at 5% solid loading for 4.5 hrs at room temperature with stirring. The pH of the solution was initially 0.5 and rose to pH 1.15 after 4.5 hours. The slurry after dissolution was filtered using vacuum and the filtrate was labelled SP1. It was analysed by ICP and FIG. 7 shows the results. This represents the first acid treatment step of the current invention. It was split into two samples, SP2 and SP3 for subsequent precipitation experiments.

Figure 8:
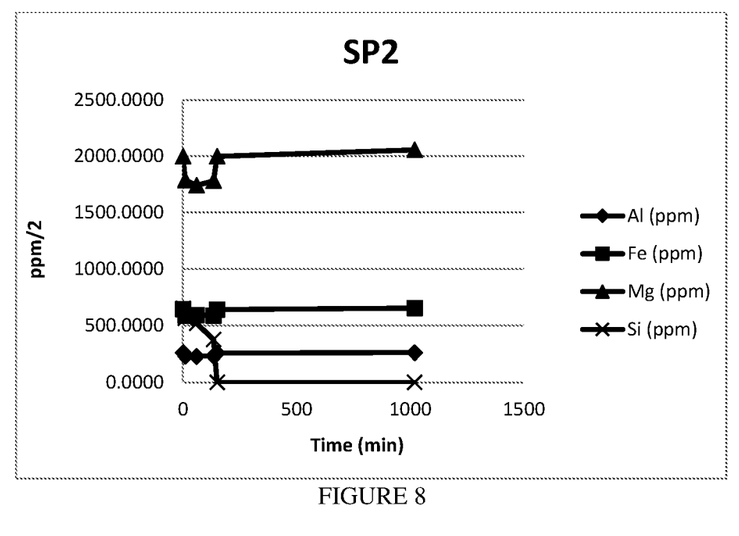
FIG. 8 shows ICP results (Example 4)

The pH of the SP2 solution was then lowered by addition of concentrated sulfuric acid. At time zero the pH was 0.98. 15 mL 50% sulfuric acid was added to lower the pH to −0.8 at room temperature. After 90 minutes the solution was at pH −0.78 and was heated to 80° C. After 15 min it reached 80° C. and the pH reduced to −1.32. Three batches of 10 mL 50% sulfuric acid were added while the solution was held at 80° C. The pH after each batch of acid addition reduced to −1.5, −1.8 and −2 respectively. After 150 min the precipitation of silica was observed. The solution, which now contained colloidal silica, was left overnight and the filtered solution was analysed by ICP the following day. FIG. 8 shows the ICP results. This shows that the precipitate was pure silica, as none of the other metal species reduced in concentration hence did not co-precipitate.

The SP3 sample was heated to 80° C. On reaching 80° C., the experiment commenced and this was considered to be time zero. The pH at time zero was 0.28. Then 4M NaOH solution was added slowly. When the pH reached 1.5, the solution turned red and initial signs of precipitation were observed. At pH 5 the solution was red and a silica gel was precipitated. After 60 minutes the experiment was stopped. ICP analysis of the solution confirmed that as well as silica, iron and aluminium from SP1 had precipitated out of solution, as hydroxides.

Figure 9:
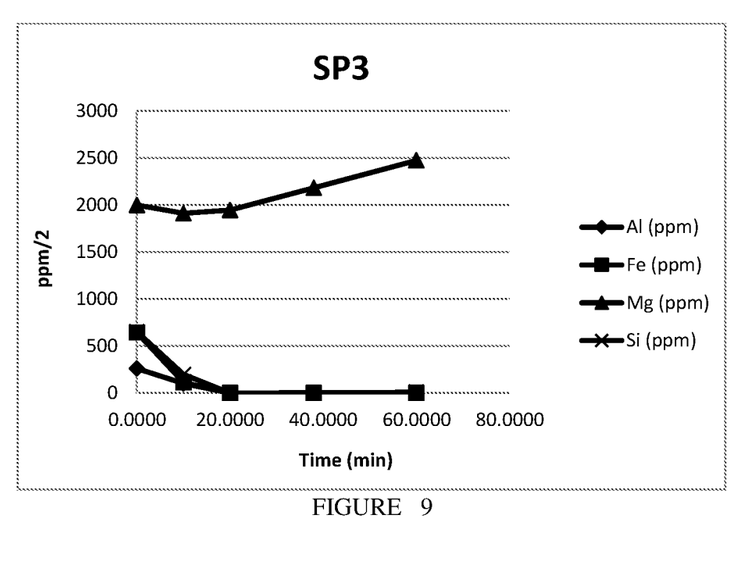
FIG. 9 shows the concentrations of these metals dropped to zero, as well as silica, confirming co-precipitation (Example 4).

FIG. 9 shows the concentrations of these metals dropped to zero, as well as silica, confirming co-precipitation.

The invention claimed is:

1. An integrated process for carbon dioxide capture, sequestration and utilisation, which comprises:
   a) providing an aqueous slurry comprising an aqueous solution and a particulate solid comprising an activated magnesium silicate mineral;
   b) in a dissolution stage, contacting a $CO_2$-containing gas stream with the aqueous slurry to dissolve magnesium from the activated magnesium silicate mineral to provide a magnesium ion enriched aqueous solution and a magnesium depleted solid residue;
   c) recovering at least a portion of the magnesium depleted solid residue;
   d) in a separate acid treatment stage, reacting the recovered portion of the magnesium depleted solid residue with a solution comprising a mineral acid or acid salt to further dissolve magnesium and other metals and to provide an acid-treated solid residue;
   e) recovering silica from the acid-treated solid residue; and
   f) in a separate precipitation stage, precipitating and recovering magnesium carbonate from the magnesium ion enriched aqueous solution.

2. The integrated process according to claim 1, wherein the dissolution stage comprises:
   b') a first dissolution stage in which the $CO_2$-containing gas stream is contacted with the aqueous slurry to partially dissolve magnesium from the activated magnesium silicate mineral to provide a magnesium ion enriched aqueous solution and a magnesium depleted solid residue; followed by
   c') recovering the magnesium depleted solid residue from b' and forming an aqueous slurry comprising an aqueous solution and the magnesium depleted solid residue;
   d') in a subsequent dissolution stage contacting a $CO_2$-containing gas stream with the aqueous slurry comprising magnesium depleted solid residue from c' to further dissolve magnesium from the magnesium depleted solid residue to provide a magnesium ion enriched aqueous solution and a further magnesium depleted solid residue;
   e') recovering at least a portion of the further magnesium depleted solid residue from d';
   f') in a separate acid treatment stage, reacting the recovered portion of the further magnesium depleted solid residue from c' and e' with a solution comprising a mineral acid or acid salt to further dissolve magnesium and other metals and to provide an acid-treated solid residue;
   g') recovering silica from the acid-treated solid residue from f'; and
   h') in a separate precipitation stage, precipitating and recovering magnesium carbonate from the magnesium ion enriched aqueous solution from the first dissolution stage b' and/or the subsequent dissolution stage d'.

3. The integrated process according to claim 2, wherein the first dissolution stage and the subsequent dissolution stage is conducted at a pressure in a range of 100-20000 kPa and a temperature in a range of 20° C.-185° C.

4. The integrated process according to claim 1, wherein the magnesium ion enriched aqueous solution is produced by dissolving the activated magnesium silicate mineral in one or more reactors fed by an input $CO_2$-containing gas stream near, at or above atmospheric pressure and thereafter, in the separate precipitation stage, inducing a pH shift in the magnesium ion enriched aqueous solution by removal of dissolved $CO_2$ through application of a partial vacuum or sub-atmospheric pressure to the magnesium ion enriched aqueous solution thereby precipitating the magnesium carbonate.

5. The integrated process according to claim 4, wherein the removed dissolved $CO_2$ is recycled back to the dissolution stage.

6. The integrated process according to claim 1, wherein the separate precipitation stage comprises two or more separate precipitation stages, wherein the magnesium ion enriched aqueous solution is produced by dissolving the activated magnesium silicate mineral in one or more reactors fed by an input $CO_2$-containing gas stream near, at or above atmospheric pressure and thereafter, in the two or more separate precipitation stages, inducing a pH shift in the magnesium ion enriched aqueous solution by removal of dissolved $CO_2$ through application of a partial vacuum or sub-atmospheric pressure in at least one of the separate precipitation stages thereby precipitating the magnesium carbonate.

7. The integrated process according to claim 1, wherein the $CO_2$-containing gas stream comprises a flue gas from a hydrocarbon combustion process.

8. The integrated process according to claim 1, further comprising subjecting the magnesium depleted solid residue to a wet magnetic separation process to extract an iron-rich portion.

9. The integrated process according to claim 1, wherein the mineral acid or acid salt used in the separate acid treatment stage is selected from $HNO_3$, $H_2SO_4$, $HCl$, $NaHSO_4$, $HBr$, $HF$, $HI$, $HClO_4$, $H_3BO_3$ and $H_3PO_4$.

10. The integrated process according to claim 1, wherein the separate acid treatment stage is conducted at a pressure in a range of 100-200 kPa and a temperature in a range of 20° C.-120° C.

11. The integrated process according to claim 1, wherein the solution in the separate acid treatment stage has a pH in the range −0.5 to 3.

12. The integrated process according to claim 1, wherein the separate acid treatment stage produces an acid solution having a pH ranging from −0.5 to 3 that comprises dissolved silica, the process further comprising raising the pH of the acid solution in the range of 4 to 8.5 by addition of a base to precipitate silica that is recovered from the acid solution.

13. The integrated process according to claim 12, wherein the pH of the acid solution is raised by addition of the base while stirring at a temperature in the range 20 to 100° C.

14. The integrated process according to claim 13, wherein dissolved metal species are precipitated out of the acid solution by selectively adjusting the pH of the solution by addition of base to recover the dissolved metal species as metal hydroxides.

15. The integrated process according to claim 14, wherein the metal hydroxides are converted to corresponding metal oxides through thermal hydrolysis or thermal decomposition or a combination thereof.

16. The integrated process according to claim 1, wherein an acid solution separated from the acid-treated solid residue in the separate acid treatment stage has a pH that is lowered below pH 0 by addition of mineral acid and precipitated silica is separated from the solution.

17. The integrated process according to claim 16, wherein temperature of the acid solution having a pH below pH 0 is in the range 20 to 80° C.

18. The integrated process according to claim 1, wherein the activated silicate mineral is activated by grinding or heating or both.

* * * * *